United States Patent
Brockhan-Luedemann et al.

(10) Patent No.: US 8,250,842 B2
(45) Date of Patent: Aug. 28, 2012

(54) CUTTING DEVICE WITH SHEAR BAR CLEARANCE CONTROL

(75) Inventors: Steffen Brockhan-Luedemann, Kirchwalsede (DE); Michael Roggenland, Arnsberg (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 13/215,361

(22) Filed: Aug. 23, 2011

(65) Prior Publication Data
US 2012/0055135 A1 Mar. 8, 2012

(30) Foreign Application Priority Data
Sep. 7, 2010 (DE) .......................... 10 2010 037 358

(51) Int. Cl.
*A01D 34/42* (2006.01)
(52) U.S. Cl. .............................. 56/249.5; 56/250; 73/104
(58) Field of Classification Search .................... 73/104; 241/101.2, 37, 101.77, 222, 101.761, 137, 241/153, 170, 172, 184, DIG. 14; 451/421, 451/419, 420, 439, 5, 10; 56/250, 500, 249
See application file for complete search history.

(56) References Cited

U.S. PATENT DOCUMENTS

| | | | | |
|---|---|---|---|---|
| 4,412,212 A * | 10/1983 | Kolegraff et al. | ............. | 340/684 |
| 4,479,346 A * | 10/1984 | Chandler | ......................... | 56/250 |
| 4,516,388 A * | 5/1985 | Chandler | ......................... | 56/249 |
| 4,653,256 A * | 3/1987 | Saiia | ............................... | 56/249 |
| 4,663,924 A * | 5/1987 | Saiia | ............................... | 56/249 |
| 4,934,612 A * | 6/1990 | Johnson | .......................... | 241/37 |
| 5,018,342 A * | 5/1991 | McClure et al. | ............... | 56/10.5 |
| 5,083,976 A * | 1/1992 | McClure et al. | ................... | 460/1 |
| 5,704,199 A * | 1/1998 | Paquet et al. | .............. | 56/10.2 B |
| 6,044,637 A * | 4/2000 | Thier et al. | ....................... | 56/249 |
| 6,931,828 B2 * | 8/2005 | Kormann | ....................... | 56/250 |
| 7,024,924 B2 * | 4/2006 | Heinrich et al. | ................. | 73/104 |
| 7,121,073 B2 * | 10/2006 | Schmidt et al. | ................. | 56/249 |
| 7,231,757 B2 * | 6/2007 | Poulson et al. | ................. | 56/249 |
| 7,353,644 B2 * | 4/2008 | Silbernagel | ..................... | 56/249 |
| 7,370,461 B2 * | 5/2008 | Silbernagel | ..................... | 56/249 |
| 7,377,092 B2 * | 5/2008 | Schmidt et al. | ................. | 56/249 |
| 7,631,479 B2 * | 12/2009 | Thier et al. | ...................... | 56/249 |
| 7,788,892 B2 * | 9/2010 | Schmidt et al. | ................. | 56/249 |
| 2004/0216439 A1 * | 11/2004 | Poulson et al. | ................. | 56/249 |

FOREIGN PATENT DOCUMENTS
EP  0 291 216  11/1988
* cited by examiner

*Primary Examiner* — Arpad Fabian-Kovacs
(74) *Attorney, Agent, or Firm* — Michael J. Striker

(57) ABSTRACT

A cutting device for crop has a cutting tool which can be set into rotation, and a shear bar which can be displaced relative thereto, each of the two diametrically opposed ends of which is coupled to a control unit, thereby enabling the clearance position of the shear bar relative to the cutting tool to be changed, and a control device which activates the control units in order to change the clearance position of the shear bar, and to move the shear bar toward the cutting tool, the control device can be operated to activate the control units to each perform a working step in alternation, so that within this working step the particular activated control unit initially moves the end of the shear bar assigned thereto toward the cutting tool by a first adjusting distance, and then away from the cutting tool by a second adjusting distance, wherein the second adjusting distance is smaller than the first adjusting distance.

13 Claims, 3 Drawing Sheets

US 8,250,842 B2

CUTTING DEVICE WITH SHEAR BAR CLEARANCE CONTROL

CROSS-REFERENCE TO RELATED APPLICATION

The invention described and claimed hereinbelow is also described in German Patent Application DE 10 2010 037 358.3 filed on Sep. 7, 2010. This German Patent Application, whose subject matter is incorporated here by reference, provides the basis for a claim of priority of invention under 35 U.S.C. 119(a)-(d).

BACKGROUND OF THE INVENTION

The invention relates to a cutting device for crop material.

The invention furthermore relates to a method for adjusting the shear bar of a cutting device.

Agricultural harvesting machines such as forage harvesters in particular comprise a cutting device having a cutting tool in the form of a cutting cylinder which rotates relative to a stationary shear bar. Crop that reaches an engagement region formed by the rotating cutting cylinder and the shear bar is fragmentized, being chopped in particular, by the interaction of cutting blades—which are attached to the rotating cutting cylinder—with the shear bar. The cutting cylinder is therefore also referred to as the chopper drum.

The cutting blades become worn during operation. They are therefore sharpened repeatedly, in order to attain a consistent cutting quality and minimize the cutting forces and, therefore, the drive energy required for chopping.

Every time sharpening is performed, material is removed from the cutting blades when the blunt cutting edges are sharpened. The distance between the shear bar and the cutting edges of the cutting blades attached to the cutting cylinder is changed as a result. The chopping process is thereby impaired.

For the chopping process to be precise and energy-efficient, not only is knife sharpness important, there must also be a certain distance between the shear bar and the cutting tool. If the distance is too great, a portion of the incoming material may not be cut completely, and greater cutting forces may be required. If the distance is too small, there is a risk in particular that the cutting blades and shear bar will touch each other, which can result in material damage and even cause material and/or machine elements to come loose, which is hazardous.

Therefore, there is a need to be able to precisely adjust the distance between the shear bar and the cutting tool, which poses a design challenge due to the high cutting forces that occur during operation.

From practical application it is known to couple a control unit to each of the diametrically opposed ends of the shear bar which comprises a counterblade bar extending approximately parallel to the rotation axis of the cutting cylinder. The two control units can be controlled using a control device, thereby enabling the clearance position of the shear bar relative to the cutting tool to be changed. Since the control units can be controlled independently of one another, the shear bar can be adjusted one side at a time.

It is imperative that the clearance be determined or at least estimated in order to set a clearance position of the shear bar that is adapted to the sharpened state of the cutting tool after sharpening. In practical application, this is carried out by moving the shear bar toward the rotating cutting tool until contact occurs, which can be detected by way of "knocking", for instance, which can be detected in particular using "knock sensors" which are vibration sensors mounted on the shear bar.

To set a desired clearance between the shear bar and the cutting tool, it is known to move the shear bar—after the cutting tool has been sharpened—out of a position located at a distance from the cutting tool and move same toward the cutting tool. According to EP 0 291 216 B1, the control unit of a first side is activated first, in order to move the side of the shear bar assigned thereto toward the cutting tool until contact occurs between the rotating cutting tool and the shear bar. After contact occurs, the first side is retracted by a certain distance in order to attain a desired clearance. Once this first side has been adjusted, the diametrically opposed, second side of the shear bar is adjusted in the same manner, i.e. it is moved forward until contact occurs, and is then retracted by a desired distance.

Such an adjustment has disadvantages. Due to the above-mentioned high forces acting on the shear bar during operation, said shear bar is mounted in a rigid manner such that it cannot be adjusted without inducing a reaction. Adjusting the shear bar on one side therefore results in a load being placed on the shear bar itself and/or on the particular control unit. When the shear bar is moved forward in the manner described in EP 0 291 216 B1, there is a risk, therefore, that the shear bar will "jump" into the cutting tool due to various mechanical effects (sagging effects, rebounding, transition from stiction to kinetic friction). This can cause damage to the cutting tool and results in an inaccurate setting.

Since knock sensors used so far typically only detect contact of the shear bar with the cutting tool per se, and are unable to determine the location of the contact point, there is another risk, namely that contact detected by the sensor will be ascribed to the side of the control unit being activated at the moment, although the contact actually took place on the other side, due to loads and resulting uncontrolled return motions or other effects. As a result, the clearance position is set incorrectly.

SUMMARY OF THE INVENTION

The problem addressed by the present invention is therefore that of providing a cutting device of the initially stated type that enables the shear bar to be moved toward the cutting tool in a more accurate manner, and prevents damage to the cutting tool or the shear bar. In addition, a method having the corresponding purpose will be provided.

This problem is solved by a cutting device according to claim 1. According thereto, the end of the shear bar—which is moved by the control unit—approaches the cutting tool by a defined adjusting distance, according to the invention, in each of the working steps carried out in alternation. This is accomplished by moving the particular activated side forward and in reverse, wherein the forward motion is greater than the reverse motion, therefore resulting in forward travel. According to the invention, the advantage results—as compared to exclusively forward motion—that mechanical loads on the shear bar and the particular control unit are relieved in each working step. After each working step is completed—that is, displacement forward by a first adjusting distance, followed by a second, smaller adjusting distance in the reverse direction—the particular control unit and the shear bar are therefore free of loads, thereby making it possible to prevent a case of uncontrolled "jumping", which could have occurred previously when adjusting a loaded shear bar. Furthermore, the procedure of carrying out the approach in a smooth manner and alternating sides makes it possible to attain the most parallel orientation of the shear bar relative to the cutting tool possible. In addition, the risk of knock signals being ascribed to the wrong side is reduced. The cutting device according to the invention therefore makes it possible to advance the shear bar more accurately.

Advantageously, the cutting device comprises at least one sensor which is suitable for detecting contact between the shear bar and the cutting tool, wherein the control device activates the control units depending on signals received from this sensor. In a manner known per se, this is a knock sensor, an impact sensor, or any other type of acoustic sensor, for instance. It can be disposed on the shear bar itself in order to detect structure-borne acoustic vibrations of the shear bar. A plurality of such sensors can be disposed at different positions to ensure that detection is reliable and more accurate.

As an alternative or in addition thereto, it is feasible to use at least one sensor which is suitable for detecting the point at which a minimum distance between shear bar and cutting tool has been reached, wherein the control device activates the control units depending on signals received from this sensor. In this case, the sensor therefore does not detect contact between shear bar and cutting tool, but rather detects a minimum distance between the two on the basis of suitable circumstances. For instance, the sensor could detect air vibrations (sound) which are produced by the shear bar as stimulated by the rotating cutting tool once a certain clearance position has been reached. Other types of contactless detection (e.g. optical) are feasible.

According to an advantageous development of the cutting device, if the sensor detects contact, or if a minimum clearance is attained during a working step, the particular activated control unit performs an additional adjustment of the end of the shear bar ascribed thereto by a third adjusting distance away from the cutting tool, wherein the second and third adjusting distances combined are greater than the first adjusting distance. Such an adjustment ensures that the shear bar is advantageously oriented parallel to the cutting tool to the greatest extent possible by moving that side of the shear bar away from the cutting tool which is assumed—on the basis of the sensor signal—to have made contact or reached a minimum clearance during the adjustment procedure. The problem of ascribing sides to sensor signals, which was made difficult due to previous sensor systems, is therefore avoided by way of design.

Advantageously, the control device initiates the alternating activation of the control units until the sensor has detected contact or a minimum clearance relative to the cutting tool in each of two consecutive working steps.

The adjustment which is provided according to the invention can be attained, advantageously, by assigning to each side of the shear bar a measuring device that is suitable for detecting a quantity that corresponds to the displacement travel of the particular side. Such measuring devices can be incremental sensors, for instance. Using such measuring devices, each of the control units can displace the end of the shear bar assigned thereto forward or backward by defined adjusting distances relative to the cutting tool.

Expediently, the cutting device comprises a starting device, wherein activating the starting device causes the control device to run a program for setting a shear bar clearance which can be defined in the program. Performing an adjustment in accordance with a program running in the control device offers the advantage that measures to be carried out to set the shear bar clearance, and conditions to be met can be incorporated therein in a flexible manner.

Advantageously, the alternating activation of the control units can start with activation of the one of two control units that, according to a signal from the measuring device assigned thereto, has a smaller clearance from the cutting tool.

To attain a desired shear bar clearance, the control device can be expediently operated to move the shear bar—by activating the control units—out of a starting position, which was found by advancing toward the cutting tool, into an operating position that is located at a specifiable distance from the starting position. Such a distance can be stored, in an editable manner, in a program that is run by the control device, for instance.

As mentioned above, the shear bar is mounted in a relatively rigid manner due to high forces acting thereon. In order to overcome any high stiction forces that may exist at bearing points of the shear bar—and to therefore prevent undesired "jumping"—before starting the procedure to adjust the shear bar, it is expedient for the control device to activate the control units before starting the advancement, in order to move the shear bar away from the cutting tool. Therefore, the bearing points thereof are freely movable, which facilitates precise advancement.

According to a further advantageous development of the invention, after the working steps have been carried out to move the shear bar toward cutting tool, the program compares the adjusting distances of the control units and, if a difference between the adjusting distances that can be specified in the program is exceeded, prompts the adjustment procedure to be repeated.

The cutting device described above is particularly suitable for use as a working unit of an agricultural harvesting machine.

In addition to the cutting device described, the initially stated problem is solved by a method for adjusting the shear bar of a cutting device for crop according to claim 13. Regarding the effects that can be attained therewith, and regarding advantageous embodiments, reference is made to the statements provided above, which apply similarly to the method according to the invention.

The invention is explained below in greater detail with reference to the attached figures and on the basis of an embodiment. Further details and advantages of the invention result therefrom.

DESCRIPTION OF THE PREFERRED EMBODIMENTS

Figure 1:
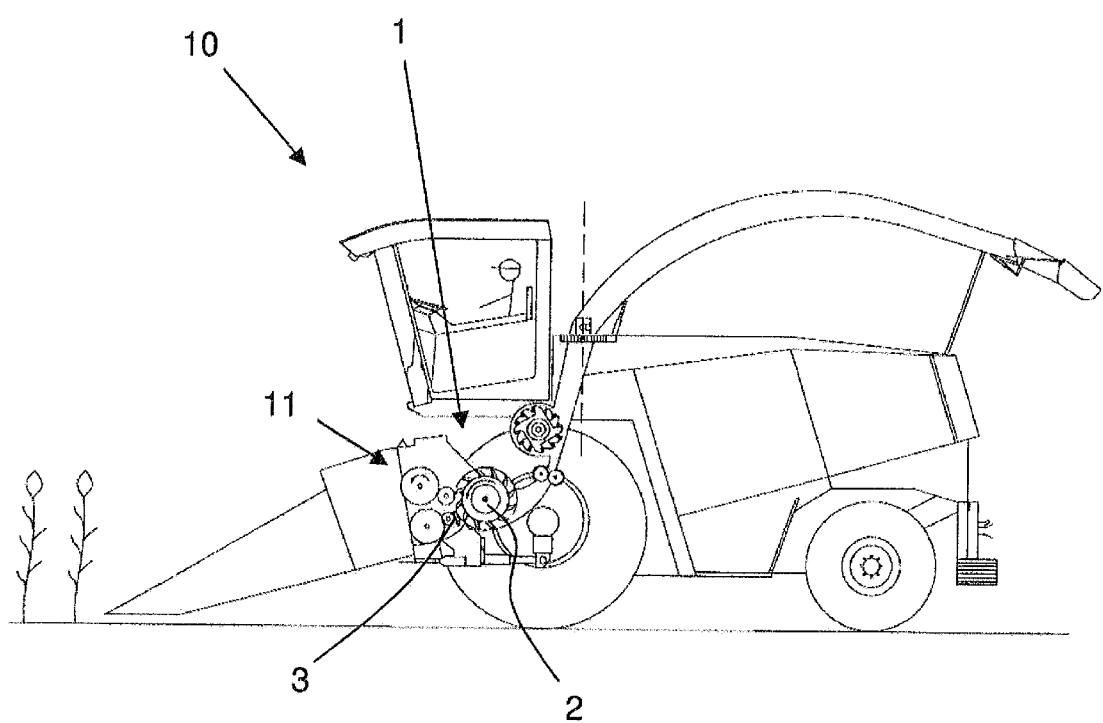
FIG. 1 shows a schematic side view of a forage harvester.

FIG. 1 shows a forage harvester 10 as an example. Forage harvester 10 is designed as a self-propelled harvesting machine having a front axle and a rear axle, and is suitable for driving across a field to harvest the plant crop which is indicated. During harvesting operation, forage harvester 10 cuts the plant crop from the field using a front attachment, which is not described in greater detail, and directs it to an intake conveyor mechanism 11 which comprises, inter alia, two pair of compression rollers which compress the harvested material. Next, the harvested material is conveyed to a cutting device 1 ("chopping assembly") which mainly comprises a rotating cutting cylinder 2 and a shear bar 3 which is stationary relative thereto. The design and mode of operation of cutting device 1 are explained in greater detail with reference to FIGS. 2 and 3. The crop is fragmentized as it passes through cutting device 1, thereby enabling it to be conveyed through a conveyor chute which rises behind a driver's cab, and, adjacent thereto, through an upper discharge chute, for ejection out of forage harvester 10.

Cutting cylinder 2 is equipped with a large number of knives (which are not labelled in FIG. 1) and, during harvesting operation, rotates in the counterclockwise direction, as indicated in FIG. 1, in order to cut crop in interaction with stationary shear bar 3, said crop then being conveyed by intake conveyor mechanism 11 as prepressed crop mat in the direction of cutting device 1.

Since the knives become worn during the harvesting operation, they should be sharpened as needed, which is carried out by using a sharpening device to remove material from the knife edges that have become blunt. Since material is removed, the distance between shear bar 3 and the edge of the knife attached to cutting cylinder 2, which is effective in the chopping process, has changed after the sharpening procedure. The invention relates to a device and a method that enable this distance to be adjusted in a better way.

Figure 2:
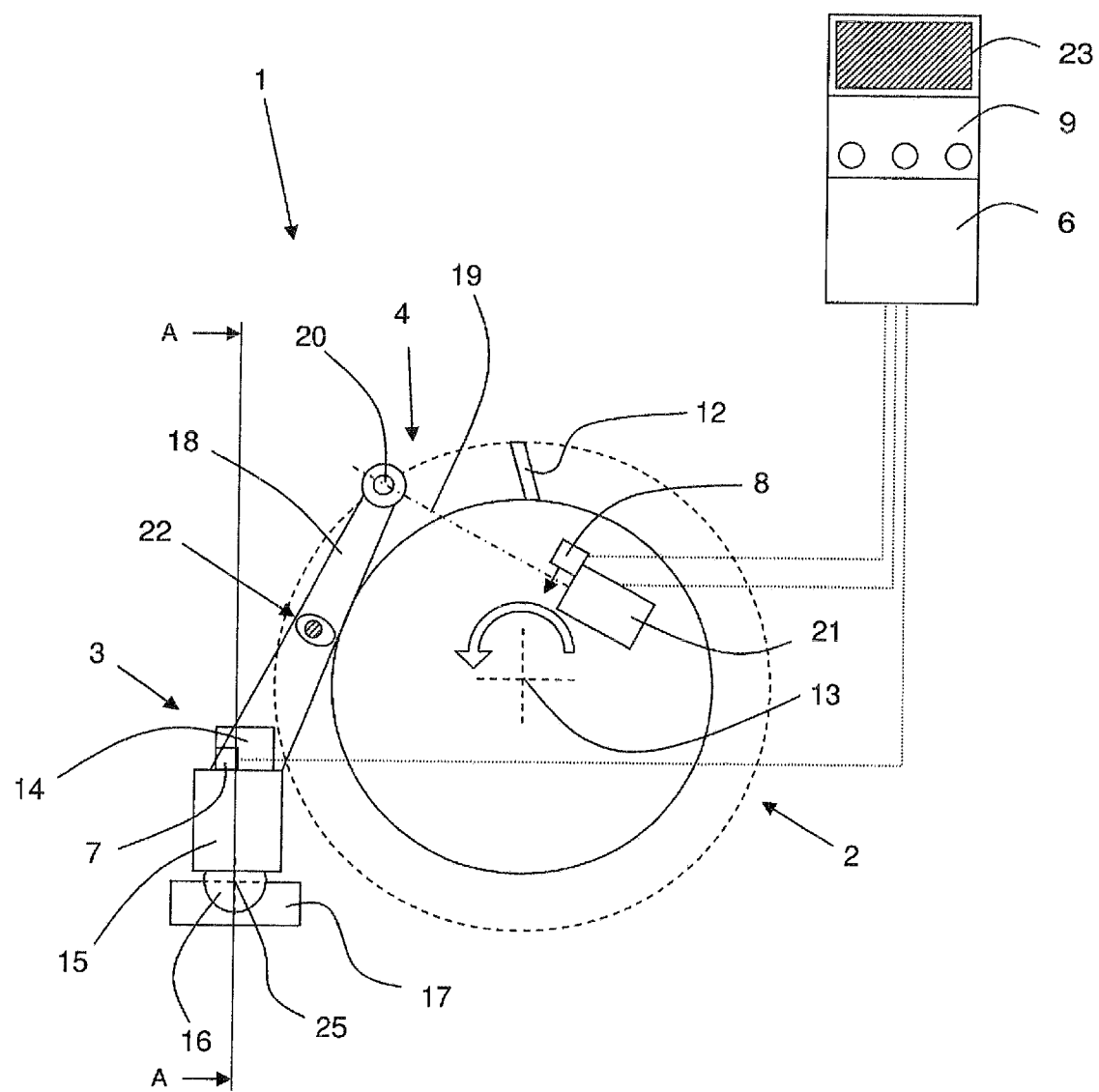
FIG. 2 shows a schematic side view of an embodiment of a cutting device according to the invention.
Figure 3:
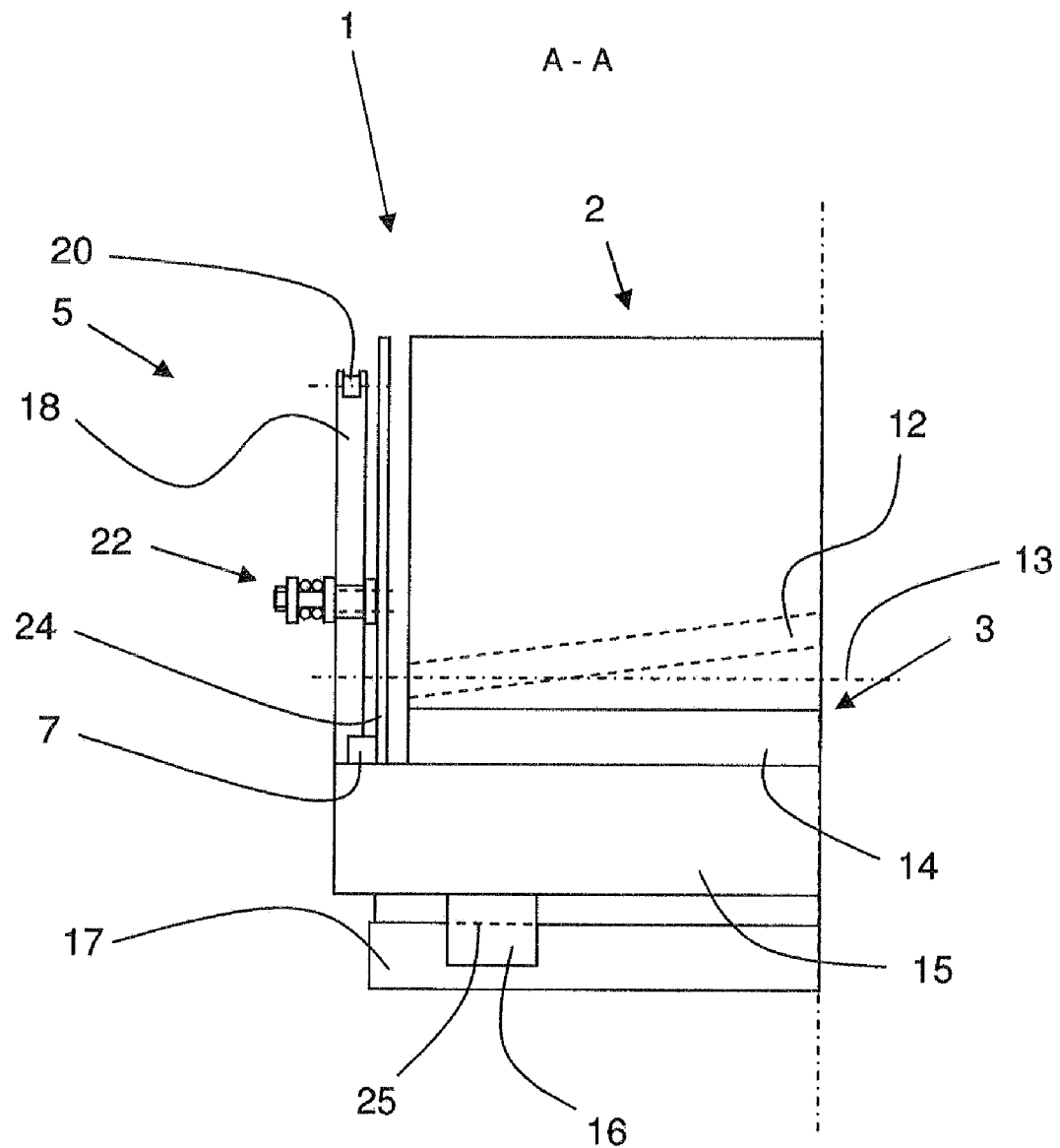
FIG. 3 shows a schematic view of the cutting device from FIG. 2 according to the line of cut A-A in the half-sectional view from the front without signal connections to the control device.

FIGS. 2 and 3 show an embodiment of a cutting device 1 according to the invention in a schematicized side view and according to the line of cut A-A in a half-sectional view from the front. The half-sectional view according to FIG. 3 can be supplemented with a mirror image thereof relative to the dash-dotted line on the right side of the image to form a complete depiction. Cutting device 1 according to FIGS. 2 and 3 is advantageously used in a forage harvester 10 of the type described with reference to FIG. 1.

Cutting device 1 shown mainly comprises a cutting cylinder 2, which can rotate about a rotation axis 13, and a shear bar 3 which can be adjusted relative to cutting cylinder 2. As an example, a cutting blade 12 attached to cutting cylinder 2 is shown, which belongs to a large number of further cutting blades which are distributed around the circumference and are not shown. When cutting cylinder 2 rotates about rotation axis 13, cutting blades 12 sweep over the outer enclosing circle of cutting cylinder 2, which is indicated in FIG. 2. The radius of this enclosing circle is influenced by the sharpened state of cutting blades 12.

Shear bar 3 mainly comprises a shear bar carrier 15 on which a counterblade bar 14 is mounted, e.g. by way of a threaded connection. Shear bar carrier 15 is supported by way of pivot heads 16 opposite a crossmember 17 which is secured to the housing.

Shear bar 3 is therefore able to swivel about a swivel axis 25 that extends parallel to rotation axis 13, wherein the clearance position of counterblade bar 14 relative to cutting cylinder 2 can be changed by swivelling the shear bar 3.

While counterblade bar 14 extends approximately across the width of cutting cylinder 2, as shown in FIG. 3, shear bar carrier 15 has a greater width. A vibration sensor 7, which is used as a knock sensor, is mounted on shear bar carrier 15 on each of the lateral end regions. Since FIG. 2 is a side view and FIG. 3 shows cutting device 1 merely in a half-sectional view, only one of the vibration sensors 7 is visible in each case.

As shown in FIG. 2, each of the vibration sensors 7 is connected via a cable to a control device 6 which preferably contains a microprocessor for data processing and is suitable for running freely programmable working programs.

FIGS. 2 and 3 show that the lateral ends of shear bar 3 are each coupled to a control unit 4 and 5, wherein FIG. 2 shows control unit 4, and, due to the different perspective of presentation, FIG. 3 shows the diametrically opposed control unit 5 which has the same design as control unit 4. Control units 4, 5 can be used to change the clearance position of shear bar 3 relative to cutting cylinder 2.

For this purpose, a lever arm 18 which extends transversely to rotation axis 13 of cutting cylinder 2 is attached at each end of shear bar carrier 15, laterally on the outside of cutting cylinder 2 in each case. Lever arm 18 is equipped with a friction brake 22. A passage is therefore formed in each lever arm 18, which—as indicated using an oval shape in FIG. 2—is larger than the cross section of a brake pin which extends therethrough and is fastened to a housing wall 24 (see FIG. 3). Lever arm 18 is therefore movable relative to housing wall 24 secured to the frame, within the travel predefined by the passage, in order to adjust shear bar 3. The play of lever arm 18 is braked, however, by a spring preload applied to the brake pin.

Lever arm 18—and, therefore, entire shear bar 3—can be adjusted using a screw mechanism which is driven by a motor 21 which is secured to the frame. The output axle of motor 21 is therefore designed as threaded spindle 19 which engages in a spindle nut 20 mounted on the end of lever arm 18 facing away from shear bar 15. Rotating the output axle of motor 21 therefore causes shear bar 3 to swivel.

Since control units 4 and 5 on both sides of shear bar 3 comprise motors 21 which can be actuated independently of one another, shear bar 3 can be adjusted one side at a time. Due to the statically redundant support of shear bar 3, performing adjustments on one side at a time results in loads being placed on the components involved, which can cause shear bar 3 to deform.

A control device 6 controls motors 21 via a signal line to adjust the clearance position of shear bar 3. Advantageously, control device 6 is thereby connected to vibration sensors 7 which are suitable for detecting contact between shear bar 3 and cutting, cylinder 2, and to incremental sensors 8 which are assigned one-to-one to motors 21 and are suitable for detecting adjusting distances of particular control unit 4 or 5. Furthermore, in order to exchange signals, control device 6 is connected to an operator control device 9 to which a display 23 is advantageously assigned. Expediently, at least operator control device 9 and display 23 are disposed in a driver's cab of forage harvester 10 so they can be actuated by a machine operator or display information to the machine operator regarding the adjustment procedure.

An adjustment of shear bar 3 takes place as described below. After cutting blade 12 has been sharpened, the distance between the effective cutting edge of cutting cylinder 2 and shear bar 3 has changed and is initially unknown. In order to set a desired distance (for harvesting operation, for example) between shear bar 3 and cutting cylinder 2, a machine operator actuates a starting device provided on operator control device 9. Control device 6 then runs a program to adjust the shear bar clearance.

Shear bar 3 is initially moved away from cutting cylinder 2 by a certain adjusting distance using the two control units 4 and 5. The purpose of this preliminary retraction is to provide enable pivot heads 16 to move relative to crossmember 17, and to enable brakes 22 to move on lever arms 18. Now the actual adjustment procedure begins.

The adjustment procedure involves moving shear bar 3 toward cutting cylinder 2 in a low-load manner. For this purpose, according to the invention, control device 6 activates control units 4 or 5 to perform one working step each in alternation. Advantageously, control device 6 triggers that control unit 4 or 5 to start advancing that is closer to cutting cylinder 2 according to a positional signal from incremental sensor 8 assigned thereto. Incremental sensors 8 can comprise pulse generators, for instance, thereby ensuring that the side having the smaller pulse range starts with the adjustment procedure.

The working steps, which should now be carried out in alternation, involve the particular activated control unit 4 or 5 initially moving the end of shear bar 3 assigned thereto toward cutting cylinder 2 by the amount of a first adjusting distance, and then away from cutting cylinder 2 by a second adjusting distance, wherein the second adjusting distance is smaller than the first adjusting distance. It is thereby ensured that shear bar 3 approaches cutting cylinder 2 with the particular activated side in a relatively load-free manner due to its being advanced and then retracted. According to an advantageous embodiment of the invention, the first adjusting distance is approximately twice as great as the second adjusting distance. The alternating manner in which these working steps are carried out, by activating the two control units 4 and 5, results in shear bar 3 approaching cutting cylinder 2 in a stepwise manner while maintaining the orientation thereof relative to cutting cylinder 2.

Advantageously, control device 6 performs monitoring using vibration sensors 7 ("knock sensors") to determine whether shear bar 3 comes in contact cutting cylinder 2—which rotates during the adjustment procedure—while the individual working steps are carried out. If contact does occur, the particular working step that is carried out is modified in that control device 6 activates the particular activated control unit 4 or 5 in such a way that control unit 4 or 5 retracts the side of shear bar 3 assigned thereto by the second adjusting distance and then by a third adjusting distance away from cutting cylinder 2, wherein the second and third adjusting distances combined are greater than the first adjusting distance. Such a working step, in which a collision with cutting cylinder 2 was detected, effectively results in the active side of shear bar 3 being retracted away from cutting cylinder 2 As a result, a parallel orientation of shear bar 3 relative to the actual edge shape of cutting blade 12 attached to cutting cylinder 2 is advantageously attained. Since it has not been possible to ascribe the knock signals to a particular side even when a plurality of interspaced vibration sensors 7 is used, this procedure is an advantageous way to orient the shear bar in parallel.

Advantageously, shear bar 3 is advanced by activating control units 4 and 5 in alternation until the sensor system detects contact with cutting cylinder 2 in two consecutive working steps. It is thereby ensured that shear bar 3 has reached a minimum distance from cutting cylinder 2 and is oriented parallel to the edge of blade 12.

To rule out possible adjustment errors due to falsely detected contact signals or other interferences, it can also be provided that, after completion of the working steps to move shear bar 3 toward cutting cylinder 2, the adjusting distances of control units 4, 5, which were detected using incremental sensor 8, are compared in the program and, if a difference between the adjusting distances—which can be specified in the program—is exceeded, then a rerun of the entire adjustment procedure is initiated.

Control device 6 can then move shear bar 3 out of the starting position reached by approaching cutting cylinder 2 by activating motors 21, and into an operating position which is desired for harvesting operation and has a distance from the starting position that can be specified by the operator in the running program, for example. Control device 6 monitors the operation of motors 21 via particular incremental sensor 8, thereby ensuring that exact positioning can be achieved.

Advantageously, the operating position is approached by motors 21 in alternation in small steps, to avoid loading shear bar 3 and control units 4, 5.

It will be understood that each of the elements described above, or two or more together, may also find a useful application in other types of constructions and methods differing from the types described above.

While the invention has been illustrated and described as embodied in a cutting device and a method for adjusting a shear bar, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A cutting device for crop, comprising
a cutting tool settable into rotation;
a shear bar displaceable relative to said cutting tool and having two diametrically opposed ends;
a control device coupled to said two diametrically opposed ends of said shear bar, so that a clearance position of said shear bar relative to said cutting tool is changeable;
control units activated by said control device to change the clearance position of said shear bar, and
wherein said control device, to move said shear bar toward said cutting tool, operates to activate said control units to perform in alteration a working step in which a respective one of said control units activated initially moves a respective one of said ends of said shear bar assigned to said respective one of said control units toward said cutting tool by a first adjusting distance, and then away from said cutting tool by a second adjusting distance which is smaller than said first adjusting distance.

2. The cutting device as defined in claim 1, further comprising at least one sensor detecting contact between said shear bar and said cutting tool, and sending signals, wherein said control device activates said control units depending on said signals received from said sensor.

3. The cutting device as defined in claim 1, further comprising at least one sensor detecting a point at which a minimal distance between said shear bar and said cutting tool has been reached and sending signals, wherein said control device activates said control units depending on said signals received from said sensor.

4. The cutting device as defined in claim 1, further comprising a sensor detecting a contact between said shear bar and said cutting tool, or a point at which a minimal distance between said shear bar and said cutting tool has been achieved, and sending signals, depending on which said control device activates a respective one of said control units to perform an additional adjustment of a respective one of the ends of said shear bar ascribed thereto by a third adjusting distance away from said cutting tool, wherein said second adjusting distance and said third adjusting distance combined are greater than said first adjusting distance.

5. The cutting device as defined in claim 1, wherein said control device initiates an alternating activation of said control units until a sensor has detected contact between said shear bar and said cutting tool, or a minimal clearance of said shear bar relative to said cutting tool, in each of two consecutive working steps.

6. The cutting device as defined in claim 1, further comprising a measuring device assigned to each side of said shear bar and detecting a quantity that corresponds to a displacement travel of a particular one of said sides.

7. The cutting device as defined in claim 1, further comprising a starting device whose activation causes said control device to run a program for setting a clearance of said shear bar relative to said cutting tool.

8. The cutting device as defined in claim 6, wherein said control units are formed so that alternative activation of said control units starts with an activation of one of said two control units that, according to a signal from said measuring device, has a smaller clearance from said cutting tool.

9. The cutting device as defined in claim 1, wherein said control device is operated to move said shear bar, by activating said control units, out of a starting position, which was found by advancing toward said cutting tool, into an operating position that is located in a specifiable distance from said starting position.

10. The cutting device as defined in claim 7, wherein said program ensures that said control units are activated to move said shear bar away from said cutting tool before working steps are implemented to move said shear bar toward said cutting tool.

11. The cutting device as defined in claim 10, wherein said control device moves said shear bar toward said cutting tool, compares adjusting distances of said control units and, if a specified difference is exceeded, prompts an adjustment procedure to be repeated.

12. The cutting device as defined in claim 1, wherein said cutting device is a working unit of an agricultural harvesting machine.

13. A method for adjusting a shear bar of a cutting device for crop, comprising the steps of setting a cutting tool of the cutting device in rotation;

displacing a shear bar relative to said cutting tool;

coupling each of two diametrically opposed ends of said shear bar to a control device to enable a change of a clearance position of said shear bar relative to said cutting tool; and to move said shear bar toward said cutting tool, activating control units by said control device to perform in alteration a working step including initially moving by a respective one of said activated control units a respective one of said ends of said shear bar assigned to said one activated control unit, toward said cutting tool by a first adjusting distance, and then away from said cutting tool by a second adjusting distance which is smaller than said first adjusting distance.

\* \* \* \* \*